G. J. WALSH.
HORSESHOE.
APPLICATION FILED DEC. 28, 1912. RENEWED AUG. 22, 1916.

1,212,592. Patented Jan. 16, 1917.

George J. Walsh.
Inventor

Witnesses:

UNITED STATES PATENT OFFICE.

GEORGE J. WALSH, OF BROOKLYN, NEW YORK.

HORSESHOE.

1,212,592. Specification of Letters Patent. Patented Jan. 16, 1917.

Application filed December 28, 1912, Serial No. 739,014. Renewed August 22, 1916. Serial No. 116,389.

*To all whom it may concern:*

Be it known that I, GEORGE J. WALSH, a citizen of the United States, and resident of Brooklyn, in the county of Kings and State of New York, have invented certain new and useful Improvements in Horseshoes, of which the following is a specification.

This invention relates to horse shoes and its object is to provide in the shoe itself means by which the horse may easily walk on slippery streets especially where asphaltum pavement is used, these means consisting of a front sharpened calk to dig into the ice or asphaltum while the horse moves forward, oblique intermediate calks with sharp lower edges to prevent side slipping or straddling and rear or heel calks bifurcated and having square edges by which the horse may dig into the ice or pavement while stopping or backing. These and other objects and details are more fully described in the following specification, set forth in the claim and illustrated in the accompanying drawings, wherein—

Figure 1:
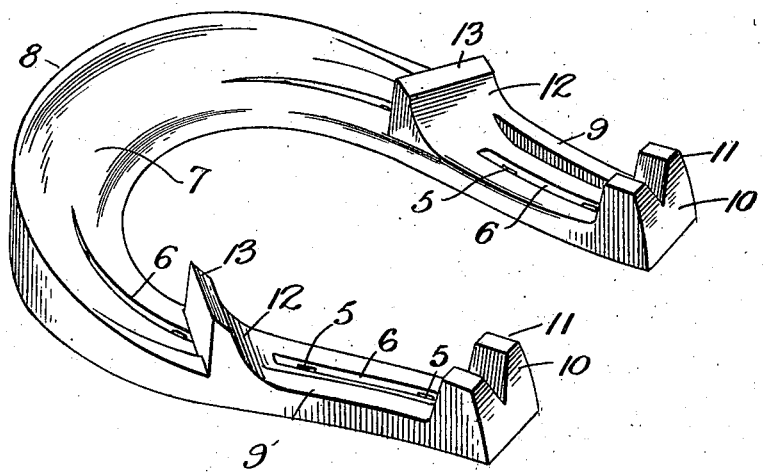
Figure 2:
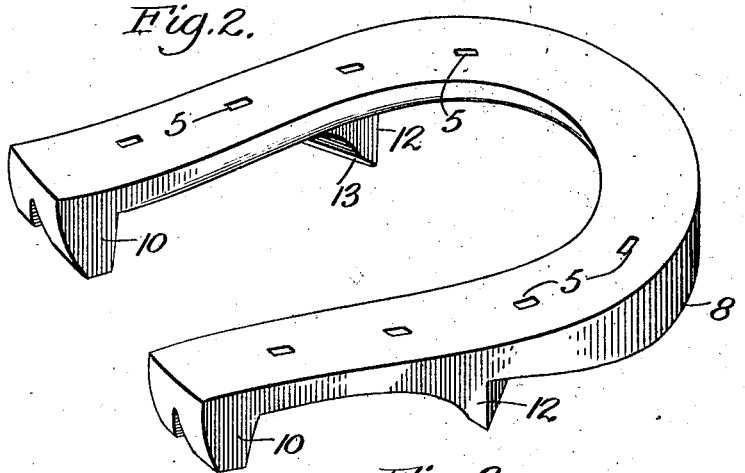
Figure 3:
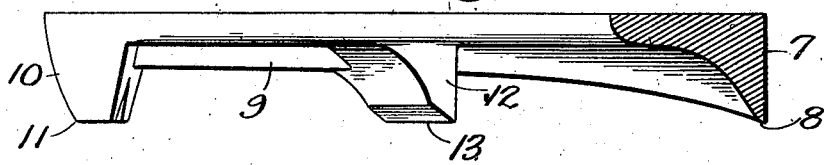

Figure 1 is a perspective view of the horseshoe from its lower side. Fig. 2 is a similar view from the upper side. Fig. 3 is a longitudinal sectional view.

The present invention comprises a shoe of the usual shape and adapted to fit the hoof of the horse, being nailed thereon in the usual manner and holes 5 and a groove, 6 being provided for that purpose. It is usual to provide horse shoes in winter with overshoes to prevent slipping on pavements, but the shoe shown in the drawings and hereinafter described is intended for use on slippery pavements such as asphaltum, dispensing with the overshoe and having its forward end provided with a rounded calk, 7, conforming to the shape of the front of the shoe and having an edge 8, on its lower side. The edge 8 merges at the side of the shoe into a flange 9, at the outer side of the shoe and which terminates at the heel calks, 10. The latter are bifurcated and have edges 11 adapted to cut into the ice or pavement when the horse is in the act of backing.

At each side of the shoe, between the toe and heel calks is an oblique calk 12, set at about 45° from the longitudinal center of the shoe, and having a chisel edge 13. This calk engages the ice or mud on the pavement and prevents side slipping of the hoof and straddling of the legs. The construction of this shoe affords the horse a purchase on icy or muddy pavements and prevents the slipping or sliding of the horse in any direction, while the round sharp calk at the front affords means for gripping the surface of the pavement when the horse is pulling a load or climbing a hill. When backing or stopping suddenly, the heel calks are put in use, and enable the horse to dig into the ice and find a purchase, while the oblique calks provide against side slipping. The middle calk 12 prevents the other two from entering and wedging in cracks between paving stones or railroad tracks and tearing off the shoe or throwing the horse or rider, where if the front and rear calks only are employed it is often the case that the heel calk becomes caught and jammed in crevices but the middle calk balances the two extremities of the shoe. The curve of the front calk precludes its entering a straight crevice and wedging. The large majority of such openings are in cobble stone and wooden pavements and about car tracks. It is obvious that the shape and position of these calks may be altered or modified without departing from the essential features above described or the scope of the appended claim.

What I claim as new and desire to secure by Letters Patent is:

A horse shoe of the usual U-shaped configuration having heel calks and having its lower face at the outer edge thereof flanked with a flange which extends continuously from the heel calks around the front of the shoe, the edge of said flange at the front of the shoe being sharp and said edge lying in the plane of the ends of the heel calks and thence sloping gradually to the forward sides of the heel calks, and a single fulcrum calk located midway between each heel calk and the middle of the said sharpened edge and having its edge substantially in the plane of the said sharp edge of the flange and the ends of the heel calks and disposed obliquely to the median line of the shoe and the forward edges of the heel calks, and the sharp edge of the flange.

Signed at New York in the county of New York and State of New York this 14th day of Dec. A. D. 1912.

GEORGE J. WALSH.

Witnesses:
 CHARLES LA RUE,
 JAMES F. DUHAMEL.